(12) United States Patent
Grebing (10) Patent No.: US 10,820,766 B2
(45) Date of Patent: Nov. 3, 2020

(54) ASSEMBLY OF A PARTICLE COLLECTION CONTAINER AND CYCLONIC PRE-SEPARATOR

(71) Applicant: FESTOOL GMBH, Wendlingen (DE)

(72) Inventor: Gerhard Grebing, Nurtingen (DE)

(73) Assignee: FESTOOL GMBH, Wendlingen (DE)

( * ) Notice: Subject to any disclaimer, the term of this patent is extended or adjusted under 35 U.S.C. 154(b) by 0 days.

(21) Appl. No.: 16/500,432

(22) PCT Filed: Apr. 11, 2017

(86) PCT No.: PCT/EP2017/058692
§ 371 (c)(1),
(2) Date: Oct. 3, 2019

(87) PCT Pub. No.: WO2018/188735
PCT Pub. Date: Oct. 18, 2018

(65) Prior Publication Data
US 2020/0196814 A1    Jun. 25, 2020

(51) Int. Cl.
| A47L 9/16 | (2006.01) |
|---|---|
| A47L 5/36 | (2006.01) |
| B01D 46/00 | (2006.01) |
| B01D 45/16 | (2006.01) |

(52) U.S. Cl.
CPC ........... *A47L 9/1608* (2013.01); *A47L 9/1683* (2013.01); *A47L 5/362* (2013.01); *A47L 5/365* (2013.01); *A47L 9/165* (2013.01); *A47L 9/1658* (2013.01); *A47L 9/1691* (2013.01); *B01D 45/16* (2013.01); *B01D 46/0046* (2013.01); *B01D 2247/101* (2013.01)

(58) Field of Classification Search
CPC ...... A47L 9/1608; A47L 9/1683; A47L 5/362; A47L 5/365; A47L 9/165; A47L 9/1658; A47L 9/1691; A47L 9/16; B01D 45/16; B01D 46/0046; B01D 2247/101
See application file for complete search history.

(56) References Cited

U.S. PATENT DOCUMENTS

| 3,570,222 A | 3/1971 | Dudek et al. |
| 4,036,346 A | 7/1977 | Livingston |
| 2005/0132676 A1 | 6/2005 | Nhan et al. |

(Continued)

OTHER PUBLICATIONS

International Search Report in corresponding PCT/EP2017/058692, dated Feb. 13, 2018.

(Continued)

*Primary Examiner* — David Redding
(74) *Attorney, Agent, or Firm* — Bacon & Thomas, PLLC (57) ABSTRACT

An assembly that includes a particle collecting container and a cyclone pre-separator placed on the particle collecting container, where the particle collecting container has a rectangular container bottom and four container peripheral walls which extend upwards from the container bottom and define a horizontal outer contour of the particle collecting container, and where the cyclone pre-separator has a particle outlet which is designed to dispense particles which have been separated in the cyclone pre-separator into the particle collecting container. The horizontal outer contour defined by the container peripheral walls tapers towards the container bottom and the particle collecting container can be stacked into an identical particle collecting container.

17 Claims, 5 Drawing Sheets

(56) References Cited

U.S. PATENT DOCUMENTS

2008/0041421 A1    2/2008  Ha et al.

OTHER PUBLICATIONS

Written Opinion in corresponding PCT/EP2017/058692, dated Feb. 13, 2018.
"Ultimate Dust Deputy Kit" by "Oneida air Systems" https://www.oneida-air.com/ultimate-dust-deputy-cyclone-kit-fesetool-vacs, downloaded Aug. 16, 2019.

ASSEMBLY OF A PARTICLE COLLECTION CONTAINER AND CYCLONIC PRE-SEPARATOR

The invention relates to an assembly comprising a particle collecting container and a cyclone pre-separator placed on the particle collecting container, wherein the particle collecting container has a rectangular container bottom and four container peripheral walls, which extend upwards from the container bottom and define a horizontal outer contour of the particle collecting container, and wherein the cyclone pre-separator has a particle outlet which is adapted to dispense particles, which have been separated in the cyclone pre-separator, into the particle collecting container.

BACKGROUND OF THE INVENTION

The assembly described is typically operated as a separating preliminary stage of a suction device. Here the cyclone pre-separator is connected to the suction device, so that the airflow sucked in by the suction device first passes through the cyclone pre-separator and then the suction unit. This allows a majority of the particles contained in the airflow to be removed already in the cyclone pre-separator, so that fewer particles are transported to the suction device. This is a particular advantage if the suction device has a bag and/or filter, by which particles are separated and which has to be changed when a particular fill level/degree of soiling is reached.

Because a majority of the particles have already been removed from the airflow by the cyclone pre-separator, filling/soiling of the bag/filter is slower, meaning less frequent changes or longer usage of the bag/filter. The particles separated in the cyclone pre-separator are dispensed into the particle collecting container and collected there.

The assembly described of cyclone pre-separator and particle collecting container is in particular used in the manual crafts sector, where it is operated as a separating preliminary stage of the bag suction devices commonly used there in order to achieve the abovementioned advantage of longer usability of the bag.

By way of example, the company "Oneida AirSystems" offers an assembly comprising a cyclone pre-separator and a particle collecting container under the product name "Ultimate Dust Deputy". The cyclone pre separator can be connected to a bag suction device common in the manual crafts sector. The cyclone pre-separator has a conical basic shape and can be positioned via screw connections on a cover of a particle collecting container. The particle collecting container has a rectangular shape and is intended to accept a plastic bag in which in turn the particles separated by the cyclone pre-separator are collected.

An object of the invention is to improve the abovementioned assembly such that it is easier and more efficient to use. This object is achieved by the features indicated in the characterizing portion of claim 1. According to the invention, the particle collecting container is designed such that the horizontal outer contour defined by the container peripheral walls tapers towards the container bottom and the particle collecting container can be stacked into an identical particle collecting container.

Since that the particle collecting container is designed to taper downwards and can be stacked into an identical particle collecting container, a plurality of particle collecting containers can be transported in a stack in a very space-efficient manner. It is therefore possible, in a space-efficient manner, to take a plurality of particle collecting containers together to the point of use so that the particle collecting containers provide sufficient collecting volume overall to collect the particles separated by the cyclone pre-separator. The abovementioned plastic bag used in the prior art can then be dispensed with and the separated particles can be collected directly in the particle collecting containers. The assembly according to the invention can therefore be used more simply and efficiently.

The feature that the particle collecting container can be stacked into an identical particle collecting container means that at least 50%, in particular at least 70%, of its vertical dimensions or vertical extension can be inserted into an identically constructed particle collecting container. This feature also means in particular that at least three identical particle collecting containers can be inter-stacked such that they can together form a stable, vertical stack.

SUMMARY OF THE INVENTION

The feature that the container peripheral walls define a horizontal outer contour is intended to mean in particular that the container peripheral walls provide the lateral outer walling of the particle collecting container and thus determine its outer contour.

The described form of the particle collecting container—namely that the horizontal outer contour defined by the container peripheral walls tapers downwards—is referred to in the following as "conical". In particular the horizontal outer contour tapers continuously and/or as far as the container bottom and/or over the entire vertical extension of the particle collecting container.

Expediently the cyclone pre-separator is a purely passive device. In particular, the cyclone pre-separator does not require a current supply to separate particles. Preferably the cyclone pre-separator does not have its own suction unit.

Advantageous embodiments are the subject matter of the dependent claims.

Preferably the assembly comprises an additional particle collecting container with an identical design to the particle collecting container. Expediently the particle collecting container is stacked in the additional particle collecting container. In the stacked state the particle collecting containers can be transported easily and in a space-efficient manner to their point of use. When the particle collecting container is full of separated particles, the cyclone pre-separator can be removed from the full particle collecting container and positioned on the additional particle collecting container so that the additionally separated particles are collected in the additional particle collecting container.

Preferably the particle collecting container is produced by injection moulding. Preferably the additional particle collecting container is also produced by injection moulding. Production by injection moulding is in particular enabled by the conical design of the particle collecting container explained above. Production by injection moulding makes the particle collecting container cheaper to produce and its design can be less bulky making it easier to carry.

Preferably the wall planes of the four container peripheral walls are inclined away from the normal vector of the container bottom. Expediently the container peripheral walls together make the shape of an inverted truncated pyramid periphery. Consequently all four container peripheral walls contribute to the downward-tapering horizonal outer contour.

Preferably the cyclone pre-separator is placed with its underside on the upper side of the particle collecting container. In particular the horizontal outer contour of the upper side of the particle collecting container is positioned within the horizontal outer contour of the underside of the cyclone pre separator. In this way the cyclone pre-separator can be placed directly on the upper side of the particle collecting container, this upper side expediently having an open design. The cover used in the prior art between cyclone pre-separator and particle collecting container is therefore unnecessary. Such a particle collecting container with a horizontal outer contour designed to be smaller than the cyclone pre separator is also easy to handle and transport.

Preferably the particle collecting container has container couplers. The container couplers are in particular non-movable container couplers. The container couplers are arranged on two opposing container peripheral walls, in particular on two longitudinal container peripheral walls. The container couplers engage with lower housing couplers of the cyclone pre-separator, in order to provide a releasable, vertically tension-proof coupling between the particle collecting container and the cyclone pre-separator. Since the container couplers are non-movable couplers, the particle collecting container can be manufactured very simply and cheaply.

The expression "releasable coupling" is intended in particular to designate a coupling that can be created and released without tools and reversibly, by way of example a coupling involving a manually operable rotary latch or a manually operable locking lug. The expression "vertically tension-proof coupling" is intended in particular to mean a coupling which transmits force vertically and which expediently remains stable in the presence of the vertical forces acting during use or transport of the cyclone pre-separator. In the context of the cyclone pre-separator and the particle collecting container "vertically tension-proof coupling" is intended in particular to mean a coupling which, through lifting of the cyclone pre-separator allows a particle collecting container coupled in a vertically tension-proof manner to be lifted with the cyclone pre-separator. Expediently a "vertically tension-proof coupling" is a coupling, which in a plurality of, preferably in all, spatial directions is tension-proof or remains stable during transfer of force.

Preferably the container peripheral walls have an upper edge. Expediently on the upper edge there is a surrounding seal. The seal allows an airtight coupling to be obtained between the cyclone pre-separator and the particle collecting container, wherein the operational suction performance can be improved.

Preferably on two opposing peripheral walls, in particular two frontal peripheral walls, the particle collecting container has container handles. By means of the container handles, the particle collecting container is particularly easily portable.

Preferably the container handles are designed as spacers which when the particle collecting container is stacked in an identical particle collecting container, ensure a predetermined vertical distance between the two upper sides of the inter-stacked particle collecting container. The result is that inter-stacked particle collecting containers can be easily removed or separated from one another.

Preferably the container handles have horizontal bars and vertical bars. Expediently the container handles are designed so that when the particle collecting container is stacked in an identical particle collecting container, lower edges of the vertical bars rest on the upper side of the identical particle collecting containers thereby ensuring the predetermined vertical distance. Such container handles are simple and cheap to manufacture.

Preferably the assembly comprises a bow-shaped carrying handle which when the cyclone pre-separator is removed from the particle collecting container can be attached to the container handles of the particle collecting container. Using such a bow-shaped carrying handle the particle collecting container can be carried with one hand.

Preferably the particle collecting container has two carrying indentations on the underside of the container bottom. In particular when the particle collecting container, due to its fill level, is especially heavy, the particle collecting container may have to be carried by its container bottom. In the embodiment described with carrying indentations the carrying person can grip the carrying indentations with their fingers to allow a better hold on the particle collecting container.

Preferably the assembly comprises a container cover which, when the cyclone pre-separator is removed from the particle collecting container, can be attached to the container handles. Expediently on the upper side of the container cover an indentation is provided which is designed to correspond with the container bottom of the particle collecting container, so that an identical particle collecting container can be stacked on the container cover in a stable manner. If, as mentioned above, a plurality of particle collecting containers is used, then when full these can be sealed with the container cover and stacked by means of the indentation provided in the cover in a stable manner one on top of the other ready for transport or storage.

Preferably the container cover is designed so that it can be stacked in an identical container cover. This allows a plurality of container covers to be inter-stacked and thus transported and stowed in a space-efficient manner.

Preferably the external dimensions of the upper side of the container cover correspond to the external dimensions of the cyclone pre separator. This makes it easier to transport a particle collecting container sealed with the container cover, together with the cyclone pre-separator and/or together with system boxes, having the same external dimensions as the cyclone pre-separator.

BRIEF DESCRIPTION OF THE DRAWINGS

Exemplary embodiments are described below by reference to the drawing.

DETAILED DESCRIPTION OF THE INVENTION

Figure 1:
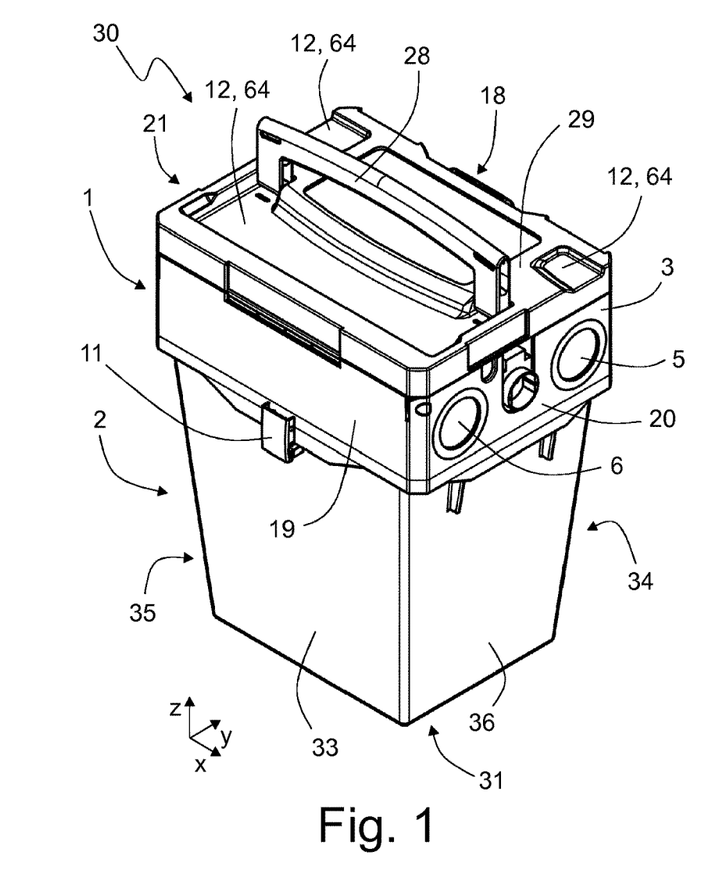
FIG. 1 shows an assembly of a particle collecting container and a cyclone separator positioned thereon.

As shown in FIG. 1, the assembly 30, comprising the cyclone pre-separator 1 and the particle collecting container 2, extends in a vertical direction, running parallel to the marked z-axis, in a longitudinal direction, running parallel to the marked x-axis, and in a transverse direction, running parallel to the marked y-axis. The x-axis, y-axis and z-axis are aligned orthogonally to each other.

Figure 6:
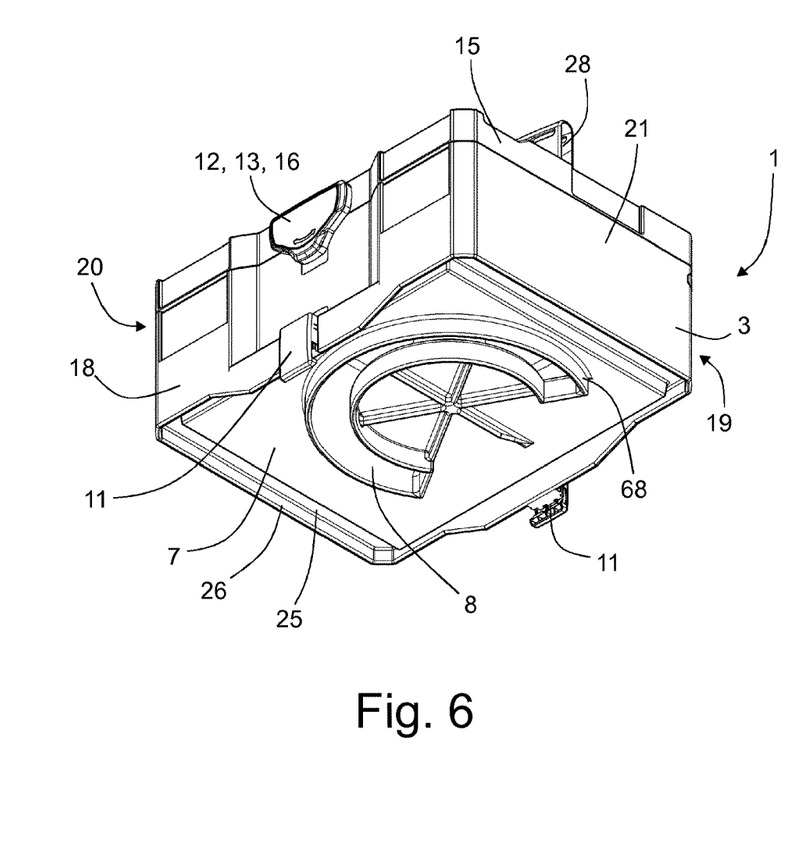
FIG. 6 shows the cyclone pre-separator from below.

The cyclone pre-separator 1 is positioned on the particle collecting container 2. The particle collecting container 2 has a rectangular container bottom 31 and four container peripheral walls 33, 34, 35, 36. The container peripheral walls 33, 34, 35, 36, extend upwards from the container bottom 31 and define a horizontal outer contour of the particle collecting container 2. The cyclone pre-separator 1 has a particle outlet 8 designed to dispense particles separated in the cyclone pre-separator into the particle collecting container 2. The particle outlet 8 is shown in FIG. 6. The horizonal outer contour defined by the container peripheral walls 33, 34, 35, 36 tapers towards the container bottom 31 and the particle collecting container 2 can be stacked in an identical particle collecting container 2.

The particle collecting container 2 can thus be transported and stowed in a stack with other particle collecting containers 2, 96 of the same design. This makes the assembly 30 easier and more efficient to use, since it is possible to take a plurality of particle collecting containers 2 together with little additional use of space and, by way of example, to use these as replacement containers for the cyclone pre-separator 1.

In the following, exemplary configurations of the assembly 30, the particle collecting container 2, the cyclone pre separator 1 and further assemblies 40, 60 and their components are discussed.

FIG. 1 shows the assembly 30 in a state in which the cyclone pre-separator 1 is positioned on the particle collecting container 2 and is connected by means of lower housing couplers 11 in a vertically tension-proof manner to the particle collecting container 2. The cyclone pre-separator 1 is positioned with its underside 7 or a groove 25 arranged on the underside 7 on the particle collecting container 2. The underside 7 is shown in FIG. 6. The horizontal outer contour of the upper side 32 of the particle collecting container 2 is positioned within the horizontal outer contour of the underside 7 of the cyclone pre-separator 1; i.e. the cyclone pre-separator 1 protrudes in all horizontal directions beyond the container peripheral walls 33, 34, 35, 36. The vertical extension of the particle collecting container 2 is greater than the vertical extension of the cyclone pre-separator 1. Preferably the particle collecting container 2 is double the height or more than double the height of the cyclone pre-separator 1.

Figure 2:
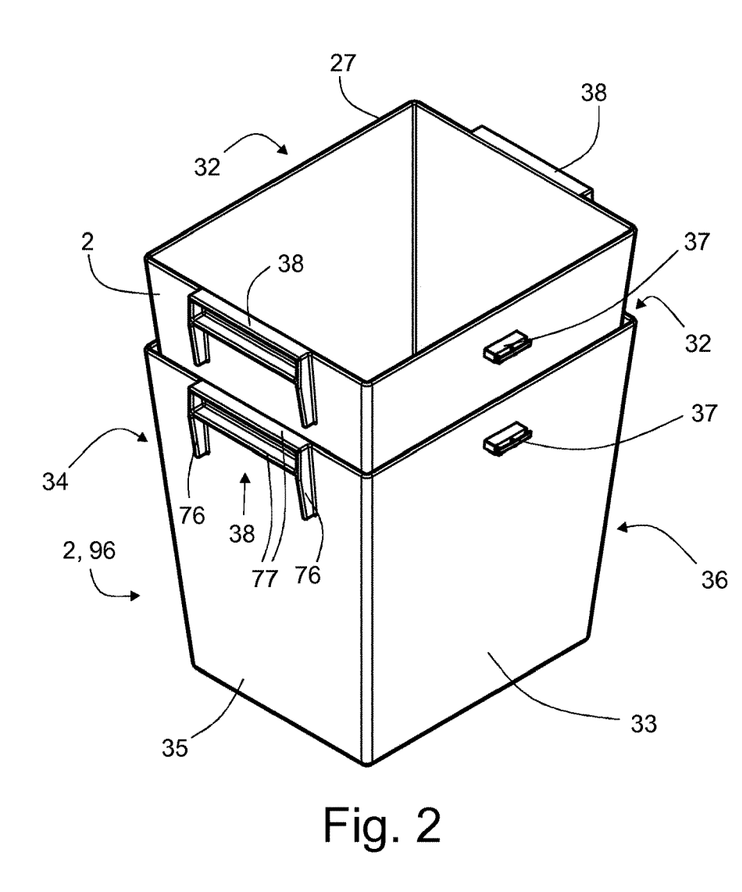
FIG. 2 shows two inter-stacked particle collecting containers.

FIG. 2 shows the particle collecting container 2, as stacked in an identical particle collecting container 2. The identical particle collecting container 2 is also referred to as an additional particle collecting container 96.

As shown in FIG. 2, the upper side 32 of the particle collecting container 2 is completely open; i.e. the upper side 32 is formed by the upper edge 27 of the container peripheral walls 33, 34, 35, 36. The height of the particle collecting container 2 is exemplarily greater than its length and greater than its width. Expediently the width of the particle collecting container 2 is less than its length.

The particle collecting container 2 and in particular the container bottom 31 are designed so that the particle collecting container 2 can be placed with the container bottom 31 on a flat surface in a stable manner, in particular also when the cyclone pre-separator 1 is positioned on the particle collecting container 2.

The container peripheral walls 33 and 34 are aligned parallel to the longitudinal direction and are also referred to as longitudinal container peripheral walls 33, 34. The container peripheral walls 35 and 36 are aligned parallel to the transverse direction and are also referred to as frontal peripheral walls 35, 36.

Exemplarily the wall planes of the four container peripheral walls 33, 34, 35, 36 are inclined away from the normal vector of the container bottom 31. Expediently the container peripheral walls 33, 34, 35, 36 together make the shape of an inverted truncated pyramid periphery. Consequently all four container peripheral walls 33, 34, 35, 36 contribute to the downward-tapering horizonal outer contour.

Preferably the particle collecting container 2 has container couplers 37. The container couplers 37 are in particular non-movable container couplers. The container couplers 37 are arranged on two opposing container peripheral walls 33, 34, in particular on the two longitudinal container peripheral walls 33, 34. The container couplers 31 can engage with lower housing couplers 11 of the cyclone pre-separator 1, in order co provide the releasable, vertically tension-proof coupling between the particle collecting container 2 and the cyclone pre-separator 1.

The container couplers 37 are expediently bar shaped protrusions. The container couplers 37 are preferably aligned with their longitudinal axis parallel to the longitudinal direction and are, in the longitudinal direction, in particular centrally arranged on the longitudinal container peripheral walls 33, 34. The container couplers 37 are also expediently located in the region of the upper side 32 of the particle collecting container 2. Exemplarily the container couplers 37 are vertically spaced apart from the upper side 32. The container couplers 37 designed as bar-shaped projections can also be referred to as functional edges.

Exemplarily, the particle collecting container 2 also has on two opposing container peripheral walls 35, 36, in particular two frontal container peripheral walls 35, 36, container handles 38. The container handles can be gripped to lift and carry the particle collecting container 2. The container handles 38 are arranged in the region of the upper side 32. Exemplarily the container handles 38 close flush with the upper side 32.

Exemplarily the container handles 38 are designed as spacers which when the particle collecting container 2 is stacked in an identical particle collecting container 2, ensure a predetermined vertical distance between the two upper sides 32 of the inter-stacked particle collecting containers.

Exemplarily the container handles 38 have two horlzontal bars 77 and two vertical bars 76. The vertical bars 76 are arranged between the horizontal bars 77 spaced apart from each other. The upper horizontal bars 77 closes flush with the upper surface 32 of the particle collecting container 2. Expediently the container handles 38 are designed so that when the particle collecting container 2 is stacked in an identical particle collecting container 2, lower edges of the vertical bars 76 rest on the upper side 32 of the identical particle collecting container 2 thereby ensuring the specified vertical distance. In FIG. 2, the lower edges of the vertical bars 76 are not yet resting on the upper side 32 of lower particle collecting container 2 so that the upper particle collecting container 2 can still be pushed further into the lower particle collecting container 2.

The particle collecting container 2 and the additional particle collecting container 96 are exemplarily produced by injection moulding.

Expediently on the upper edge 27 there is a surrounding seal. Expediently the upper edge 27 is formed by the surrounding seal. The seal is in particular made from elastic material and can by way of example be injection-mounded onto the container peripheral walls 33, 31, 35, 36. Alternatively or additionally the surrounding seal can also be attached to the cyclone pre-separator 1, in particular in the groove 25. In this case the surrounding seal is then located on the edge 27, when the cyclone pre-separator 1 is positioned on the particle collecting container 2.

The wall surfaces of the container peripheral walls 33, 34, 35, 36 exemplarily have a substantially flat design. Preferably the wall surfaces of the container peripheral walls 33, 34, 35, 36 with the exception of the container couplers 37 and the container handles 38 have a flat design. On the flat design wall surfaces one or more masking labels can by way of example be applied. Expediently the particle collecting container 2 can also have a pocket, by way of example, in one of the container peripheral walls 33, 34, 35, 36, designed for receiving and/or securing a tracking device. The tracking device may, by way of example, be a Bluetooth and/or a GPS module. Expediently, the tracking device is arranged in the pocket.

Figure 3:
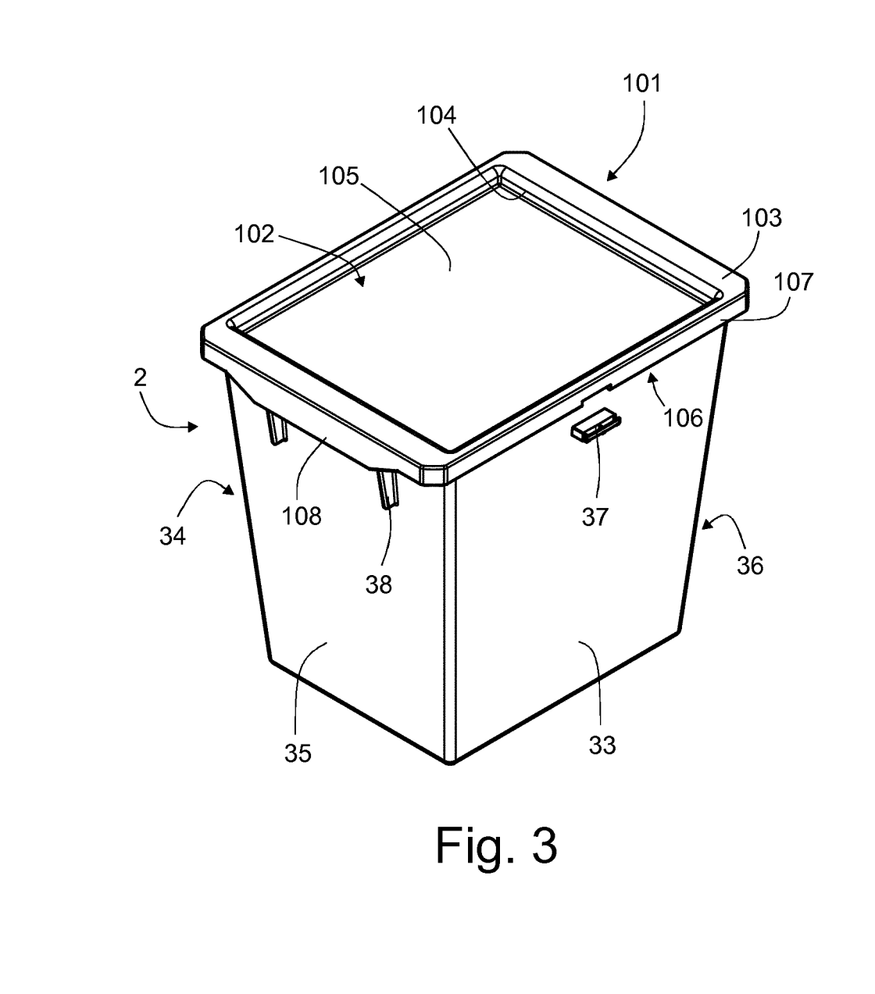
FIG. 3 shows a particle collecting container with a container cover positioned thereon.

FIG. 3 shows the particle collecting container 2 with a container cover 101 positioned on the open upper side 32. The container cover 101 fully seals the particle collecting container 2. Exemplarily on the cover upper side 103 of the container cover 101 a cover indentation 102 is provided Expediently the cover indentation 102 is designed to correspond with the container bottom 31 of the particle collecting container 2, so that an identical particle collecting container 2 can be stacked on the container cover 101 in a stable manner. Preferably the container cover 101 is designed so that it can be stacked in an identical container cover 101. Preferably the horizontal external dimensions of the container cover 101 correspond to the horizontal external dimensions of the upper side 29 of the cyclone pre-separator 1.

The indentation bottom 105 of the cover indentation 102 exemplarily has a rectangular design and is connected via an indentation side wall 104 extending upwards from the indentation bottom 105 with the cover upper side 103. From the cover upper side 103 a surrounding cover side wall 101 extends downwards. Between the indentation side wall 104 and the cover side wall 107 a cover groove 106 is configured to accept the upper edge 27 of the particle collecting container 2. In the cover groove 106 preferably a surrounding seal is provided which in particular is made from elastic material. Preferably both the indentation side wall 104 and the cover side wall are inclined relative to the normal vector, to allow the most space-efficient possible stacking of identical container covers 101. In particular the outer contour defined by the cover side wall 107 tapers upwards towards the cover upper side 103. Expediently the horizontal inner contour defined by the indentation side wall 104 tapers downwards to the indentation bottom 105. The cover indentation 102 is in particular designed so that a particle collecting container 2 can be positioned in a stable manner in the cover indentation 102 and is surrounded by and stabilised by the indentation side wall 104.

The cover side wall 107 is in particular designed so that it at least partially covers the holder handles 38 and thus protects them. To this end the cover side wall 107 has at each frontal wall a wall portion 108 protruding downwards. The cover side wall 107 is also expediently designed so that the longitudinal peripheral walls 33, 34 of the particle collecting container 2 and by way of example marking labels applied there are in particular protected from the effects of weather.

The container cover 101 can also have longitudinally on the cover upper side 103 lashing indentations, which are not shown in FIG. 3. The lashing indentations can be arranged centrally in the longitudinal direction—and thus in the longitudinal direction be located in the region of the container couplers 37. Expediently the lashing indentations are designed to hold or guide a lashing belt running transversally across the container cover.

Figure 4:
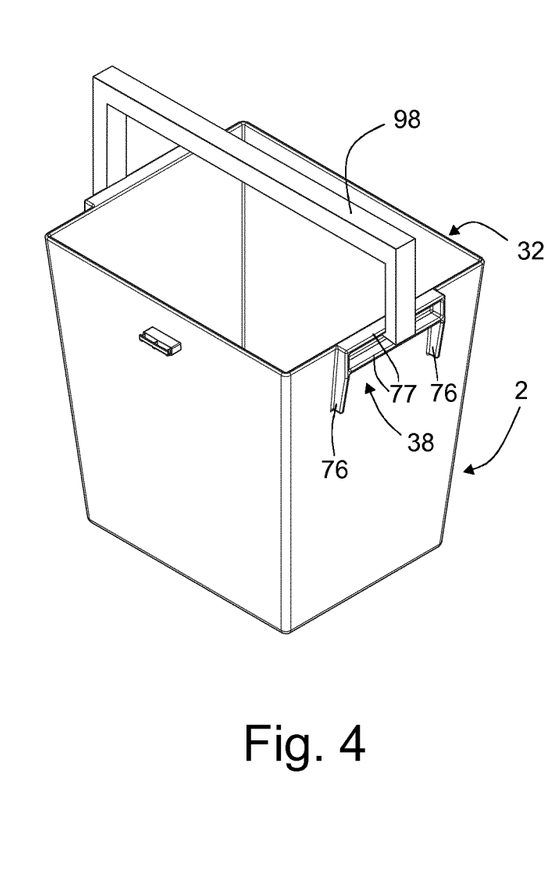
FIG. 4 shows a particle collecting container with a carrier handle attached.

FIG. 4 shows the particle collecting container with a bow-shaped carrying handle 98. The carrying handle 98 has in particular an inverted U shape. The carrying handle 98 is exemplarily mounted on the holder handles 38, in particular on the horizontal bars 77. Preferably the carrying handle 98 is mounted using a snap- and/or clamp-fastening to the container handles 38, so that in particular it can be removed from the container handles 38 or remounted on these without tools. The carrying handle 38 runs in the longitudinal direction across the open upper side 32 of the particle collecting container 2.

Figure 5:
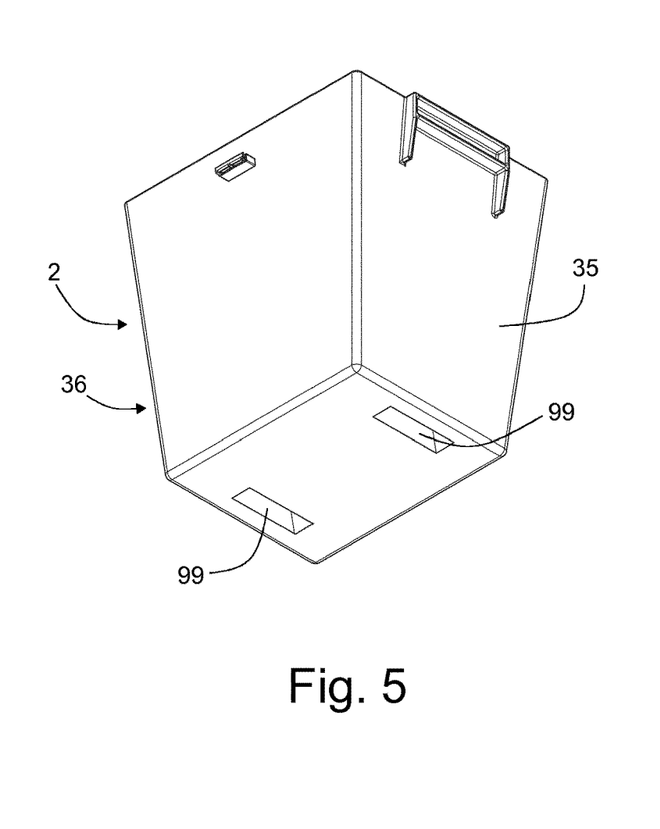
FIG. 5 shows a particle collecting container with carrier indentations.

FIG. 5 shows the particle collecting container 2 from below. Here the particle collecting container 2 is equipped on its container bottom 31 with two carrying indentations 99. The carrying indentations 99 are in particular arranged in the region of the frontal peripheral walls 35, 36. The carrying indentations 99 are in particular designed so that a person carrying the particle collecting container 2 can grip the carrying indentations with their fingers 99.

FIG. 6 shows the cyclone pre-separator 1 from below. The cyclone pre-separator 1 comprises a box-shaped housing 3. The term "box-shaped" in particular means a substantially cuboid design. "Box-shaped" also means a form where the upper side is designed so that a further box-shaped or cuboid body, in particular a system box, can be stacked on the upper side. By way of example, "box-shaped" means a form where the upper side and peripheral walls are aligned orthogonally to each other. Due to its box-shaped design, the cyclone pre-separator can be accommodated and transported in a stack of further box-shaped bodies, such as system boxes.

The height of the cyclone pre-separator 1 is exemplarily less than its width and less than its length. Expediently the width of the cyclone pre-separator 1 is less than its length. By way of example, the cyclone pre-separator 1 is between 390 mm and 400 mm, in particular 396 mm, long and between 290 mm and 300 mm, in particular 296 mm, wide. Preferably the height of the cyclone pre-separator 1 with folded carrying handle 28 is less than 200 mm. The horizontal external dimensions of the upper side 32 of the particle collecting container 2 are accordingly in particular smaller than 396 mm (in the longitudinal direction) and/or greater than 296 mm (in the transversal direction).

The housing 3 of the cyclone pre-separator 1 has four peripheral walls 18, 19, 20, 21 aligned orthogonally to each other. The peripheral walls 18, 19 are longitudinal peripheral walls and the peripheral walls 20, 21 are frontal peripheral walls.

The housing 3 has lower housing couplers 11. Exemplarily the lower housing couplers 11 comprise two movably mounted locking elements and are provided on longitudinal peripheral walls 18, 19 of the housing 3. Expediently the locking elements are arranged in the longitudinal direction centrally on the longitudinal peripheral walls 18, 19. The locking elements are in particular designed as locking lugs, mounted so that they can swivel and/or slide.

On the underside 7 of the cyclone pre-separator 1 the particle outlet 8 is arranged, which exemplarily has an annular gap or annular section gap design. Expediently the particle outlet 8 is surrounded by an edge 68 protruding vertically downwards.

On the underside 7 a groove 25 is also provided, running along the outer edge 26 of the underside 7 and designed to accept the upper edge 27 of the particle collecting container 2. The groove 25 completely surrounds the particle outlet 8 and has an overall rectangular course. The outer edge 26 of the underside is exemplarily formed by the lower edges of the peripheral walls 18, 19, 20, 21.

The housing 3 comprises a cover 15, extending over the entire horizontal extension of the cyclone pre-separator 1. The cover 15 is hinged so that it can pivot. In the open position the pivotable cover 15 provides access to the internal components of the cyclone pre-separator 1, so that these can be cleaned and maintained.

A carrying handle 28 is provided on the cover. In the example shown, the carrying handle 28 is arranged on the upper side 29 of the cover 15. The carrying handle 28 is advantageously designed so that it can selectively adopt a non-use position, in which it is swivelled onto the upper side 29 of the cover 15, or a use position, in which it is swivelled upwards and thus protrudes upwards beyond the upper side 29. The carrying handle 28 preferably has a U-shaped design.

The cyclone pre-separator 1 has an air inlet 5 and an air outlet 6, which exemplarily are arranged on the same peripheral wall, in particular on the frontal peripheral wall 20.

The cyclone pre-separator 1 uses the known operating principle of a cyclone separator or of a centrifugal separator. When there is a negative pressure at the air outlet 6 an airflow is sucked in through the air inlet 5, passes through an inlet cylinder (not shown) and is output via the air outlet 6. The inlet cylinder is designed so that the airflow is directed on a circular path, wherein particles contained in the airflow are hurled against the walls of the inlet cylinder by the centrifugal force, so that they are braked and finally output from the particle outlet 8.

The housing 3 has upper housing couplers 12, comprising a movably mounted locking element 13. The upper housing couplers 12 are designed to provide a releasable, vertically tension-proof coupling for a box-shaped body 14 in a state, in which the box-shaped body 14 is stacked on the housing 3. Such a state, in which a box-shaped body 14 is stacked on the housing 3, is for example shown in FIG. 8. Preferably the upper housing couplers 12 are suitable for providing a coupling that is tension-proof in a plurality of, in particular all, spatial directions.

The movably mounted locking element 13 is exemplarily designed as a rotary latch 16. Expediently the locking element 13 is arranged on the longitudinal peripheral side 18.

Exemplarily the upper housing couplers 12 also have engagement structures 64, suitable for engaging with corresponding engagement structures such as feet of a system box. The engagement structures 64 are provided on the upper side 29 and expediently designed as engagement indentations. The engagement structures 64 are expediently static structures—thus non-movable structures. Expediently the engagement structures 64 are designed to contribute to a vertical and/or horizontal coupling. By way of example, the engagement structures 64 can have rear grip components for this.

The cyclone pre-separator 1, in particular in terms of its cuboid basic design, its upper housing couplers 12 and the design of its upper surface 29, resembles a system box. System boxes of a system have a base area defined in the system and have couplers defined in the system or are compatible with a particular coupling system, so that system boxes of a system can be combined to form a stable stack. System boxes are, by way of example, widely used as modular toolboxes for the storage of manually-operated power tools, accessories and/or consumables. Since at least the cuboid basic design, the upper housing couplers 12 and the upper surface 29 of the cyclone pre-separator 1 are designed as in a system box, the cyclone pre-separator 1 can form the bottom-most stacking element of a stack of system boxes and in this way be efficiently stowed and transported.

The rotary latch 16 already mentioned above is arranged on the cover 15. The rotary latch 16 is designed both to lock the cover 15 and to provide the coupling with a box-shaped body 14 arranged on the cyclone pre-separator 1. The rotary latch 16 has in particular a T-shaped design and can expediently be displaced into at least three different positions: a first position in which the cover 15 is not locked and a coupling with a positioned box-shaped body 14 can be provided, a second position, in which the cover 15 is locked and no coupling with a positioned box-shaped body 14 can be provided, and a third position, in which the cover 15 is locked and coupling to a positioned box-shaped body 14 can be provided.

Figure 7:
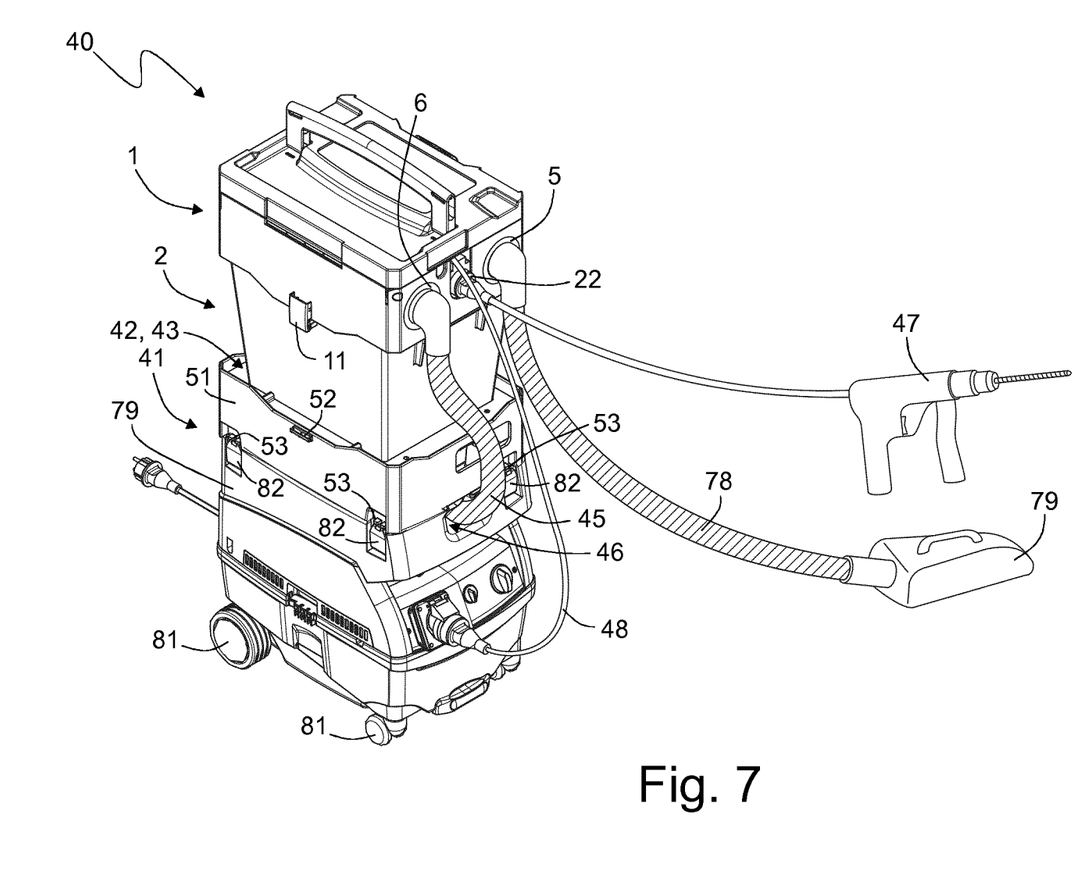
FIG. 7 shows an assembly of a cyclone pre-separator, a particle collecting container and a suction device.

FIG. 7 shows an assembly 40 of the cyclone pre-separator 1, particle collecting container 2 and a suction device 41. The cyclone pre-separator 1 is positioned on the particle collecting container 2 and through the lower housing couplers 11 and the container couplers 37 coupled in a vertically tension-proof manner to the particle collecting container 2. The particle collecting container 2 is in turn inserted in a container receptacle 43, provided on the upper side 42 of the suction device 41. The suction device 41 has a suction port 46 and is designed to provide a negative pressure at this suction port 46. The suction port 46 is connected via a hose 45 with the air outlet 6. A suction hose 78 with a suction head 79 is connected to the air inlet 5. The suction device 41 is expediently a bag suction device and/or a filter suction device.

If the suction device 41 is switched on and starts to suck, then via the suction head 79 and the suction hose 78 an airflow is sucked into the cyclone pre-separator 1. There a part of the particles present in the airflow is separated and transported to the particle collecting container 2. The airflow is output through the air outlet 6 and via the hose 45 and the suction port 46 reaches the suction device 41. There the airflow passes, by way of example, through a bag and/or a filter, where the particles still contained in the airflow at this point are separated. Due to the fact that a part of the particles has already been separated in the cyclone pre-separator 1, fewer particles reach the bag or filter, so that the bag or filter has to be changed less frequently.

The suction device 41 comprises exemplarily a suction device 79 and an adapter frame 51 positioned on the suction device 79. The container receptacle 43 is provided in the adapter frame 51.

The suction device 79 is exemplarily designed as a mobile suction device and has drive wheels 81, by which the suction device 79 is movable.

The suction device 79 has suction device couplers 82, coupled to the lower adapter frame couplers 53. Exemplarily the suction device couplers 82 comprises movably supported locking lugs and the lower adapter frame couplers 53 comprise locking projections.

The assembly 40 shown in FIG. 7 also comprises an electrical device 47, by way of example a power tool, connected to a socket 22 of the cyclone pre-separator 1. The socket 22 is in turn connected via a connecting cable 48 so the suction device 79. The suction device 79 is exemplarily designed to identify that she power tool 47 has been switched on and, in response thereto, to start sucking.

The adapter frame 51 exemplarily has upper adapter frame couplers 52, which provide a releasable, vertically tension-proof coupling with the cyclone pre-separator 1, in particular with the lower housing couplers 11 of the cyclone pre-separator 1 designed as locking lugs. The cyclone pre-separator 1 can thus be mounted directly on the adapter frame 51 for transport purposes. The adapter frame couplers 52 are in particular non-movable adapter frame couplers, expediently bar-shaped projections.

Figure 8:
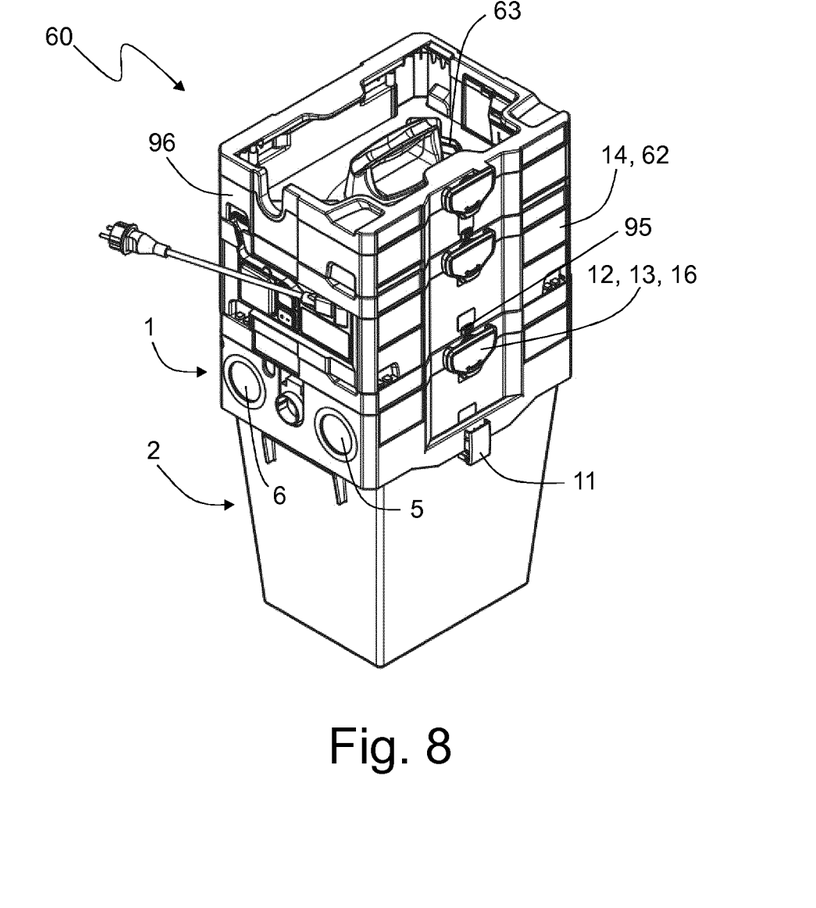
FIG. 8 shows an assembly of a box-shaped body, a cyclone pre-separator and a particle collecting container.

FIG. 8 shows an assembly 60 comprising the cyclone pre-separator 1, the particle collecting container 2 and a suction device 14. The cyclone pre-separator 1 is positioned on the particle collecting container 2. The box-shaped body 14 is arranged on the cyclone pre-separator 1 and together with the cyclone pre-separator 1 forms a vertical, substantially cuboid stack. The box-shaped body 14 has lower body couplers 95, able to interact with the upper housing couplers 12, in order to provide a releasable, vertically tension-proof coupling between the box-shaped body 14 and the cyclone pre-separator 1. In particular the lower body couplers 95 comprise a locking projection and engagement projections, not shown arranged on the underside of the box-shaped body 14.

The box-shaped body 14 is in particular a system box. Expediently the box-shaped body 14 has a suction unit 62 and a suction port 63. The suction unit 62 is expediently a bag and/or filter suction unit. The suction port 63 can be connected via a hose (not shown) with the air outlet 6 of the cyclone pre-separator 1, so that by means of the suction unit 62 the negative pressure required for the operation of the cyclone pre-separator 1 can be provided. In the example shown a box-shaped hose storage facility 96 is also positioned on the box-shaped body 14.

The invention claimed is:

1. An assembly comprising:
a particle collecting container and a cyclone pre-separator placed on the particle collecting container,
wherein the particle collecting container has a rectangular container bottom and four container peripheral walls which extend upwards from the container bottom and define a horizontal outer contour of the particle collecting container, and
wherein the cyclone pre-separator has a particle outlet which is designed to dispense particles which have been separated in the cyclone pre-separator into the particle collecting container,
wherein the horizontal outer contour defined by the container peripheral walls tapers towards the container bottom and the particle collecting container can be stacked into an identical particle collecting container.

2. The assembly according to claim 1, comprising an additional particle collecting container identical to the particle collecting container.

3. The assembly according to claim 1, wherein the particle collecting container is produced by injection moulding.

4. The assembly according to claim 1, wherein the wall planes of the four container peripheral walls are inclined away from the normal vector of the container bottom so that container peripheral walls together make the shape of an inverted truncated pyramid periphery.

5. The assembly according to claim 1, wherein the cyclone pre-separator is positioned with its underside on the upper side of the particle collecting container, wherein the horizontal outer contour of the upper side of the particle collecting container is positioned within the horizontal outer contour of the underside of the cyclone pre-separator.

6. The assembly according to claim 1, wherein the particle collecting container has container couplers arranged on two opposing container peripheral walls and can engage with lower housing couplers of the cyclone pre-separator, in order to provide a releasable, vertically tension-proof coupling between the particle collecting container and the cyclone pre-separator.

7. The assembly according to claim 1, wherein the container peripheral walls have a upper edge on which a surrounding seal is arranged.

8. The assembly according to claim 1, wherein the particle collecting container has container handles on two opposing container peripheral walls.

9. The assembly according to claim 8, wherein the container handles are designed as spacers which when the particle collecting container is stacked in an identical particle collecting container, ensure a predetermined vertical distance between the two upper surfaces of the inter-stacked particle collecting containers.

10. The assembly according to claim 9, wherein the container handles have horizontal bars and vertical bars and are designed so that when the particle collecting container is stacked in an identical particle collecting container, lower edges of the vertical bars rest on the upper surface of the identical particle collecting containers thereby ensuring the specified vertical distance.

11. The assembly according to claim 8, further comprising a bow-shaped carrying handle which when the cyclone pre-separator is removed from the particle collecting container can be attached to the container handles of the particle collecting container.

12. The assembly according to claim 1, wherein the particle collecting container has on the underside of the container bottom carrying indentations.

13. The assembly according to claim 1, also comprising a container cover, which when the cyclone pre-separator is removed from the particle collecting container, can be positioned on the particle collecting container, wherein on the upper side of the container cover an indentation is provided, designed to correspond with the container bottom of the particle collecting container so that an identical particle collecting container can be stacked on the container cover in a stable manner.

14. The assembly according to claim 13, wherein the container cover is designed so that it can be stacked in an identical container cover.

15. The assembly according to claim 13, wherein the horizontal external dimensions of the container cover correspond to the horizontal external dimensions of the upper side of the cyclone pre-separator.

16. The assembly according to claim 2, wherein the particle collecting container is stacked in the additional particle collecting container.

17. The assembly according to claim 6, wherein the container couplers are non-movable container couplers.

* * * * *